United States Patent [19]

Kitawaki et al.

[11] 4,449,717
[45] May 22, 1984

[54] SEALING MECHANISM FOR BEARINGS
[75] Inventors: Michio Kitawaki, Kyoto; Masao Annaka, Kobe, both of Japan
[73] Assignee: Mutsubishi Rubber Co., Ltd., Japan
[21] Appl. No.: 435,850
[22] Filed: Oct. 21, 1982
[30] Foreign Application Priority Data Oct. 21, 1981 [JP] Japan .................................. 56-167036
Oct. 21, 1981 [JP] Japan .......................... 56-155363[U]

[51] Int. Cl.³ ............................................. F16J 15/32
[52] U.S. Cl. ......................................... 277/153; 277/152
[58] Field of Search .................. 277/152, 153, 157, 37, 277/47

[56] References Cited
U.S. PATENT DOCUMENTS

| | | | |
|---|---|---|---|
| 3,223,426 | 12/1965 | Reid | 277/153 |
| 3,440,122 | 4/1969 | McCormick | 277/153 |
| 4,102,538 | 7/1978 | Bertin | 277/153 |
| 4,108,447 | 8/1978 | Scholin | 277/153 |

Primary Examiner—Robert I. Smith
Attorney, Agent, or Firm—William A. Drucker

[57] ABSTRACT

For a bearing mechanism, a pair of oil seals are installed within an outer cylindrical housing and elastically encircle a rotating or reciprocating shaft extending concentrically through the housing. Each of the oil seal is made of rubber or synthetic resin and has a prop ring made of steel wire extending underground through a radially outer portion of the oil seal. The prop ring is partly cut out and thus provides a radially outwardly directed elasticity for close adhesion to the inner surface of the housing. The radially outer portion of the oil seal extends in a radially inward direction to form an oil sealing lip and a dust sealing lip, with a narrow doglegged portion at an intermediate portion of the oil seal which permits the oil seal to be flexible in a radial direction. An additional seal having substantially a similar elements and structure may be installed as a dust seal.

11 Claims, 5 Drawing Figures

SEALING MECHANISM FOR BEARINGS

BACKGROUND OF THE INVENTION

This invention relates to a sealing mechanism for bearings of reciprocating or revolving shafts.

For bearings, especially in the steel making industry for bearings of revolving rolls equipped for elongators and continuous casting machines, a sufficient lubricating effect is required, and for this purpose oil seals of elastic material have been used as being ringedly interposed between an outer hausing and a shaft. The oil seals of an ordinary type found in the prior art are installed in a special accompanying tool by hammering or pressing. Such a manner of installation, however, not only requires a considerable numbers of operations but also often develops machine troubles. Moreover, the oil seals installed in such a manner are very difficult to remove, and thus unable to reuse.

It has been proposed to adhere a metallic shell to an elastic oil seal for more stable installation. However, when such a prior art oil seal is used for bearings provided for elongators which will be subjected to high temperature conditions, adhesive property of a bonding agent is decreased or denatured so that the oil seal portion and the metallic shell might be separated from each other.

In operation of elongators and continuous casting machines, generated dust, earth, sand, scale, cooling water and the other foreign materials will often enter the bearing portion and thus affecting its lubricating property. Although many attempts have been made for establishing sealing mechanism which prevents the entry of the harmful materials, satisfactory results have not been shown.

It is therefore an object of this invention to provide an improved sealing mechanism for bearings of reciprocating or revolving shafts, which eliminates defects and disadvantages inherent in the prior art sealing mechanism.

Another object of the invention is to provide a novel oil seal which completely prevents leakage of lubricating oil from bearings.

Still another object of the invention is to provide an oil seal which is easy for installation and removal without being damaged and thus reusable for many times as it is.

Yet still another object of the invention is to provide an oil seal which effectively follows up swinging and eccentricity of shafts.

Yet still another object of the invention is to provide a novel sealing mechanism which will also prevent the entry of harmful materials into bearings, thereby protecting the bearings.

BRIEF DESCRIPTION OF DRAWINGS

The foregoing and other objects as well as the characteristic features of the invention will be more easily understood by the following description and the appended claims when read in conjunction with the accompanying drawings wherein:

DESCRIPTION OF PREFERRED EMBODIMENTS

Figure 1:
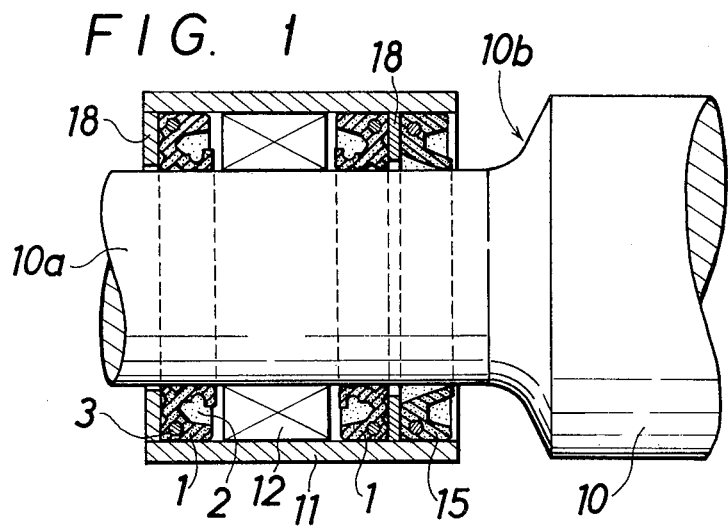
FIG. 1 is a sectional view of a sealing mechanism for bearings embodying the invention.

Referring specifically to FIG. 1, a bearing 12 is provided within a cylindrical housing 11 through which a rotating shaft 10a of a roll 10 extends concentrically therewith. On both sides of the bearing 12, a pair of ringed oil seals 1 are symmetrically provided within the housing 11 and surround the rotating shaft 10a.

Figure 2:
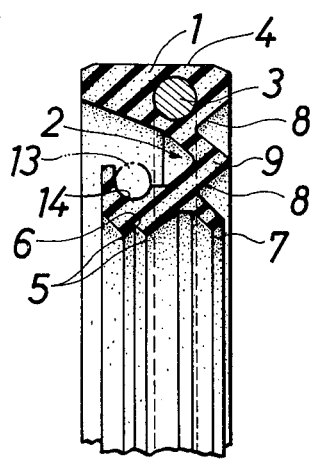
FIG. 2 is a sectional view, on an enlarged scale, showing an oil seal member shown in FIG. 1.
Figure 3:
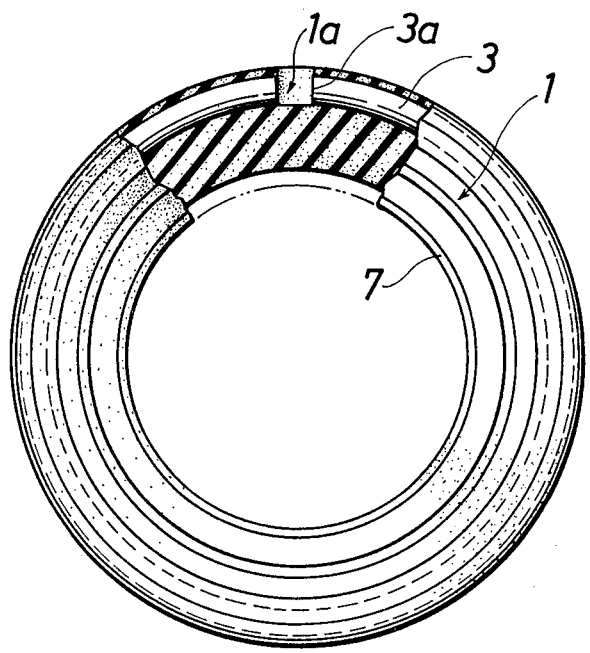
FIG. 3 is a front view, on an enlarged scale and partly in section, showing the oil seal member.

The oil seal 1 made of elastic material such as rubber and synthetic resin has an unique configuration as shown in FIG. 2. More particularly, the oil seal 1 has substantially a plain outer surface 4 which provides a sufficient contact area with an inner surface of the housing 11, whereas an inner surface of the oil seal 1 is provided with two lips 5 and 7 which will contact with the shaft 10a. One of the lip 5 provided near the bearing 12 is an oil sealing lip and preferably formed as a W-lip as shown which makes it possible to retain a lubricating oil in a groove 6 for reducing wear resistance to the shaft 10a. The other lip 7 will mainly prevents the entry of dust, water and the other harmful materials into the bearing 12 and also strengthen the oil sealing effect. An annular surface of the oil seal 1 of a side facing the bearing 12 has a V-shaped annular groove 2 which is inwardly cut out to a depth greater than half a width of the oil seal 1. The other side of an annular surface of the oil seal is provided with a W-shaped annular groove 8 which cooperate with the V-shaped groove to form a narrow expansion part 9, thus the oil seal 1 is very much flexible especially in a radial direction.

Reference numeral 3 identifies a prop ring made of steel wire, for example. The prop ring 3 is buried in and extends through the oil seal 1 just beneath the outer surface 4, as viewed in FIG. 2. The prop ring 3 is partly cut out at 3a so that its elasticity will provide a radially outwardly directed force without loosening, resulting in that a constant pressing of the oil seal 1 to the housing 11 by means of the prop ring 3 eliminates leakage of any material.

The V-shaped groove 2 has preferably a radially outwardly gouged portion 14 positioned just above the oil sealing lip 5, and a partially cut-out elastic ring 13 providing a radially inwardly directed force may be additionally set to improve oil-sealing effect of the lip 5.

As hereinbefore described the expansion part 9 will provide a radially directed flexibility, which not only makes it possible to effectively absorb swinging and offcentering of the shaft 10a while maintaining a sufficient oil sealing effect, but also makes it easy to install the oil seal 1 within a definite space between the housing 11 and the shaft 10a by hand or by using a mallet and to remove it with a lever or the like. In operation of installation and removal the oil seal 1 of the invention will not break down or will not damage the shaft 10a, the housing 11 and the bearing 12 and is thus reusable as it is.

Since the prop ring 3 is fully surrounded by the elastic material of the oil seal, the oil seal of the invention can provide the maximum heat resistance that the material possesses. Unlike the conventional oil seals of a type using an adhesive (its maximum heat resistance is about 180° C.), the oil seal of the invention can be used under a high temperature condition, namely about 200°–230°

C., even in which case the oil seal of the invention offers less bore expansion and outer diameter shrinkage, and no possibility for oil leakage. This fact also means that a secondary valcanization (at 200° C. for 24 hours, for example) can be applied to the material of the oil seal of the invention for the purpose of eliminating compression set of rubber.

A pair of guard rings 18 may be provided so as to position the oil seal 1 between the guard ring and the bearing 12 for preventing cracking or turning-over of the oil seal that might be caused by high oil pressure, resulting in higher pressure resistance of the oil seal 1.

Figure 4:
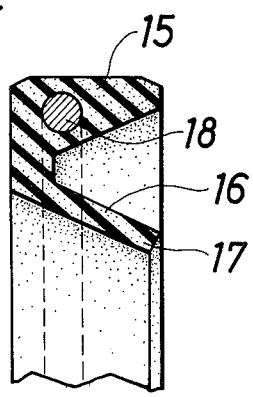
FIG. 4 is a sectional view, on an enlarged scale, showing a dust seal member shown in FIG. 1.
Figure 5:
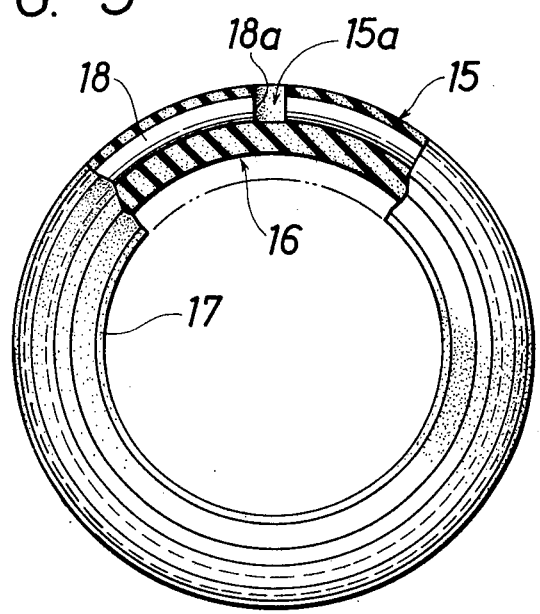
FIG. 5 is a front view, on an enlarged scale and partly in section, showing the dust seal member.

The sealing mechanism according to the invention preferably includes additionally a ringed dust seal 15. Thus, the dust seal 15 is received within a space between the housing 11 and the shaft 10a and positioned back to back with one of the oil seal 1, and thus faces a roll neck 10b for preventing the entry of dust, water, scale or any other harmful material from the roll neck 10b into the bearing portion. As shown in FIGS. 4 and 5, the dust seal 15 has configulation and structure substantially similar to those of the oil seal 1 hereinbefore described in detail. More particularly, the dust seal 15 has a plain outer surface and a prop ring 18 partially cut out at 18a, which corresponds to the elements of the oil seal 1 designated by numerals 4, 3 and 3b, respectively. An annular surface of the dust seal 15 of a side facing the roll neck 10b has a V-shaped annular groove 16 which is inwardly cut out to a depth greater than half a width of the dust seal 15, and namely which is provided in substantially the same manner as the groove 2 of the oil seal 1. Beneath the V-shaped groove 16, the dust seal 15 has an obliquely projecting dust lip 17 for sealing the entry of harmful materials. Since functions and advantages of various elements of the dust seal 15 resemble those of corresponding elements of the oil seal 1, they are not repeated hereby.

Although the invention has been shown and described in terms of preferred embodiments thereof, it should be understood that many changes and modifications will be obvious to one skilled in the art without departing from the true spirit and scope of the invention as defined in the appended claims.

What is claimed is:

1. A sealing mechanism comprising a cylindrical housing adapted to concentrically surround an axially extending shaft and a bearing to which a lubricating oil is supplied to apply a lubricating effect to said shaft, and a pair of elastic oil seals ringedly interposed between said housing and said shaft adjacent to said bearing for preventing leakage of said lubricating oil from said bearing, each of said oil seal being characterized in that:
    (a) an elastic prop ring is buried in and extends through a radially outer portion of said oil seal, said prop ring being partly cut out and thus providing a radially outwardly directed elasticity;
    (b) one of annular side surfaces of said oil seal has a V-shaped annular groove which is cut out to a depth greater than half a width of said oil seal;
    (c) the other annular side surface of said oil seal has a W-shaped annular groove which cooperates with said V-shaped groove to form a dog-legged portion integrally with said radially outer portion, said dog-legged portion improving an elasticity of said oil seal in a radial direction; and
    (d) a radially inner portion of said oil seal comprises an oil sealing lip formed integrally with said dog-legged portion.

2. The sealing mechanism of claim 1 wherein said oil seal is made of rubber or synthetic resin.

3. The sealing mechanism of claim 1 wherein said prop ring of said oil seal is made of steel wire.

4. The sealing mechanism of claim 1 wherein a pair of said oil seals are symmetrically installed so that said V-shaped groove thereof faces with said bearing.

5. The sealing mechanism of claim 1 wherein said oil sealing lip of said oil seal is W-shaped so that the lubricating oil is retained between the W-shaped lips.

6. The sealing mechanism of claim 1 or 4 wherein said radially inner portion of said oil seal further comprises a dust sealing lip formed integrally with said dog-legged portion and said oil sealing lip for preventing entry of harmful materials into said bearing.

7. The sealing mechanism of claim 1 wherein said oil seal is provided with an additional prop ring made of elastic material and surrounding said radially inner portion thereof, said additional prop ring being partly cut out and thus applying a radially inwardly directed elasticity to said oil sealing lip.

8. The sealing mechanism of claim 1 or 4 which further comprises a pair of guard rings between which a pair of said oil seals are positioned for preventing axial movement of said oil seals.

9. The sealing mechanism of claim 1 or 4 which further comprises an elastic dust seal ringedly interposed between said housing and said shaft for preventing entry of harmful materials into said oil seals and said bearing, said dust seal being characterized in that:
    (a) an elastic prop ring is buried in and extends through a radially outer portion of said dust seal, said prop ring being partly cut out and thus providing a radially outwardly directed elasticity;
    (b) one of annular side surfaces of said dust seal has a V-shaped annular groove which is cut out to a depth greater than half a width of said dust seal; and
    (c) a radially inner portion of said dust seal comprises a dust sealing lip.

10. The sealing mechanism of claim 9 wherein said dust seal is made of rubber or synthetic resin.

11. The sealing mechanism of claim 9 wherein said prop ring of said dust seal is made of steel wire.

* * * * *